Nov. 27, 1962 W. MALECKI 3,065,812
MIXTURE FLOW TYPE GOVERNOR AND CONTROL MEANS THEREFOR
Filed Feb. 17, 1960 4 Sheets-Sheet 1
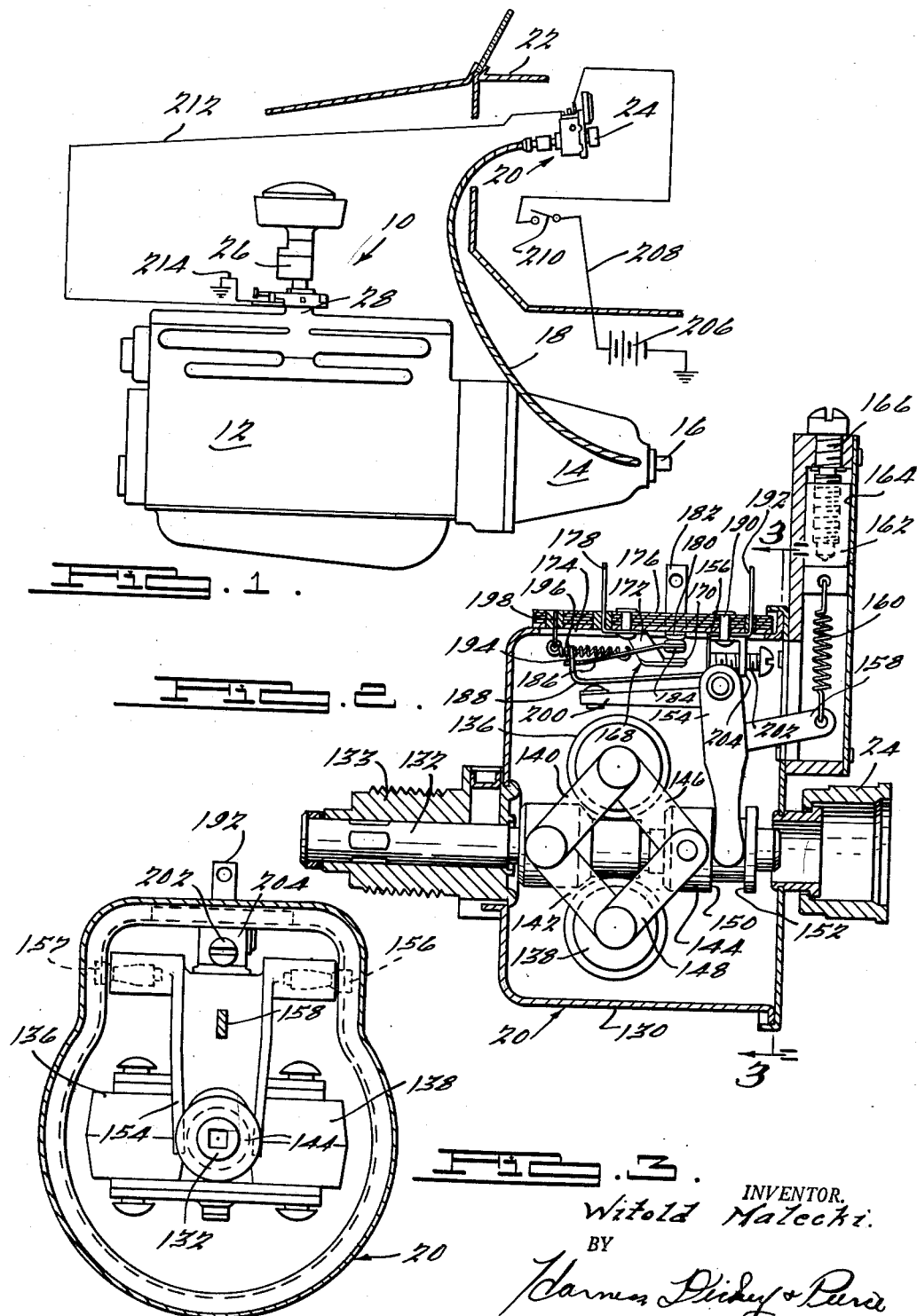
INVENTOR.
Witold Malecki.
BY
Harness, Dickey & Pierce
ATTORNEYS.

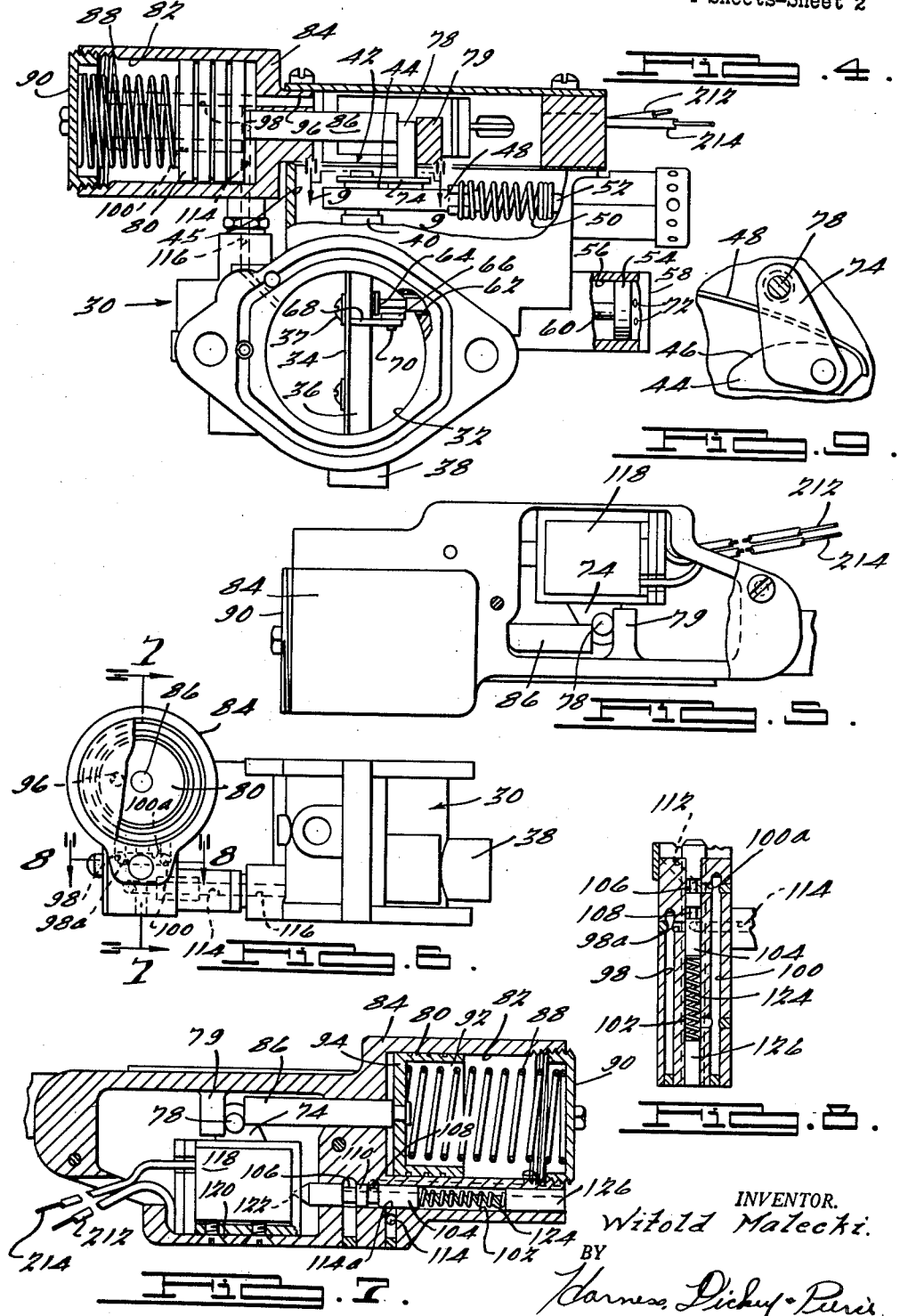

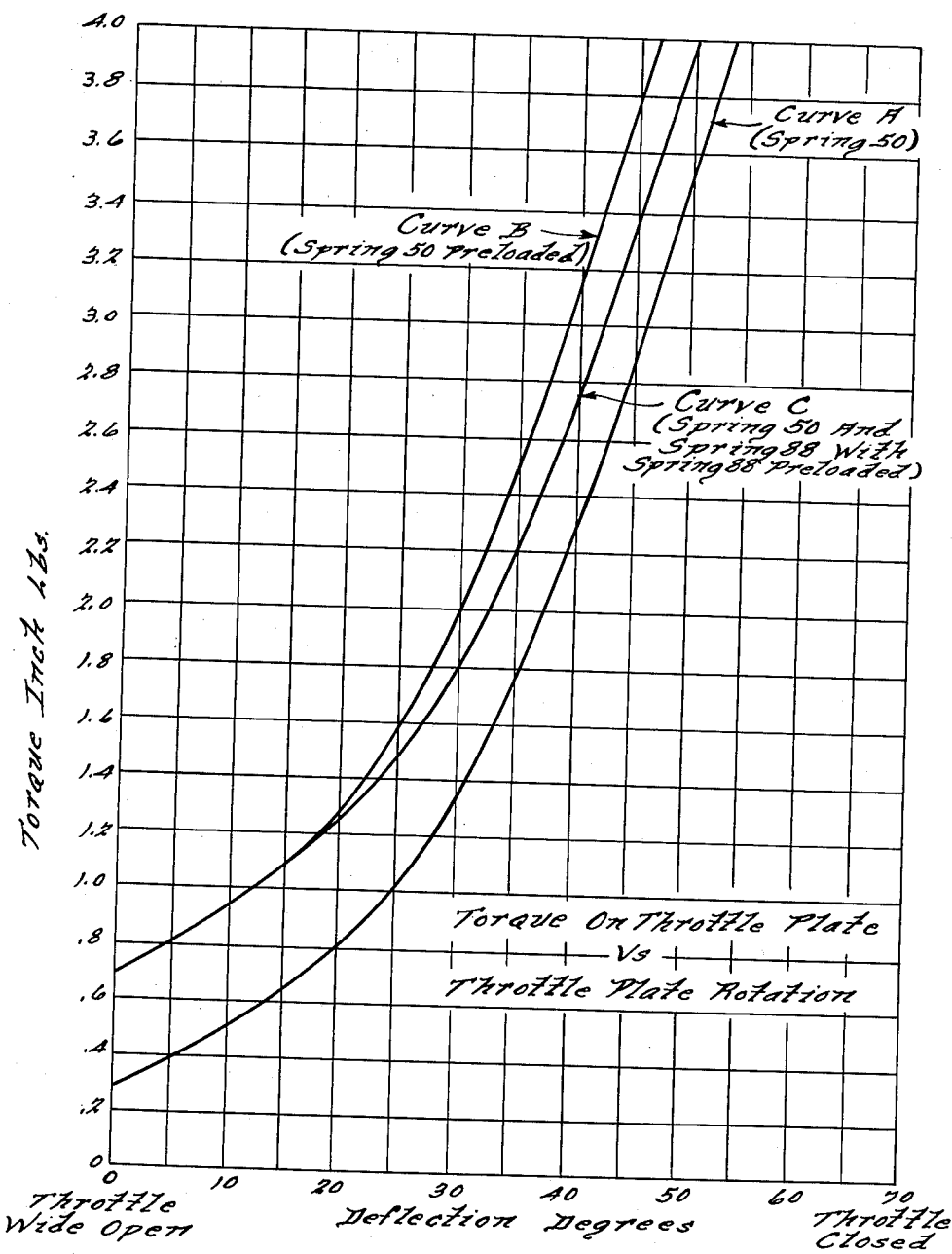

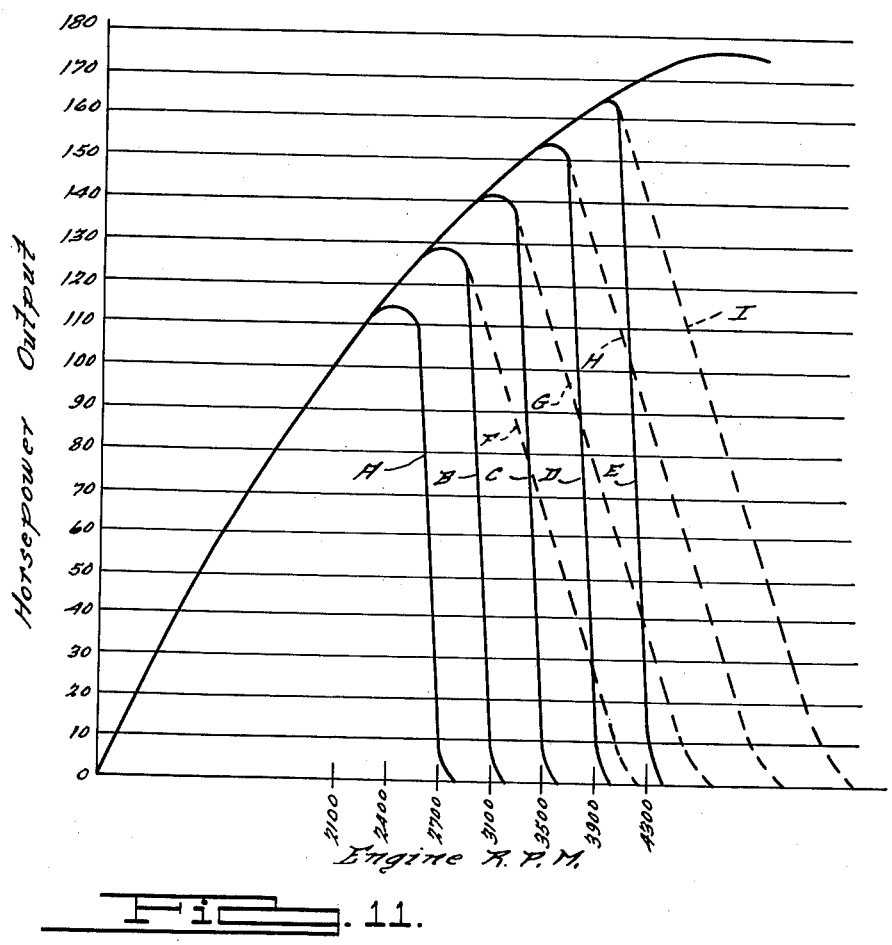

United States Patent Office 3,065,812
Patented Nov. 27, 1962

3,065,812
MIXTURE FLOW TYPE GOVERNOR AND
CONTROL MEANS THEREFOR
Witold Malecki, Ann Arbor, Mich., assignor to King-Seeley Thermos Co., a corporation of Michigan
Filed Feb. 17, 1960, Ser. No. 9,308
13 Claims. (Cl. 180—82.1)

This invention relates to governors and, more particularly, to an improved velocity or mixture flow type governor for controlling the speed of an internal combustion engine on an automotive vehicle as a function of the road speed of the vehicle.

This is a continuation-in-part of the applicant's copending application, Serial No. 706,651 filed January 2, 1958, for "Mixture Flow Type Governor and Control Means Therefor" and now abandoned.

Heretofore, velocity or mixture flow type governors have been utilized for controlling the engine speed on automotive vehicles. Such prior velocity or mixture flow type governors utilize the forces exerted on the governor throttle plate by the passage of the fuel/air mixture through the governor to move the governor throttle plate toward the closed position so as to prevent the engine from exceeding a predetermined maximum speed. However, prior velocity or mixture flow type governors have been subject to the defect that they also govern the vehicle road speed through the transmission gears of the vehicle. For example, prior governors which are set to limit the engine speed to 2200 r.p.m. and provide a maximum road speed of 40 m.p.h. with a four forward speed transmission in the high gear or direct drive range will only permit road speeds in the first, second and third gear ranges which are so slow because of the reduced gear ratio that it is not possible from a practical standpoint to obtain the appreciable acceleration which is necessary for passing ability or to permit reasonable vehicle acceleration from the curb or a traffic light, thus making the vehicle a potential traffic hazard. By way of further example, a vehicle equipped with a four forward speed transmission and capable of attaining a road speed of 75 m.p.h. under ungoverned conditions in direct drive but governed by a prior velocity or mixture flow type governor to limit the engine speed to 2200 r.p.m. thus limiting the road speed to 40 m.p.h., will only permit maximum governed speeds of 6.25 m.p.h. in first gear, 12.9 m.p.h. in second gear and 23.6 m.p.h. in third gear as compared to ungoverned top speeds of 11.6 m.p.h., 24.0 m.p.h. and 44.0 m.p.h. in the first, second and third gear ranges, respectively. The foregoing examples thus illustrate a primary objection to prior velocity or mixture flow type governors in that the road speed in the low and intermediate gear ranges is reduced approximately fifty percent.

An object of the present invention is to overcome disadvantages in prior velocity or mixture flow type governors of the indicated character and to provide an improved velocity or mixture flow type governor incorporating improved means for governing an internal combustion engine on an automotive vehicle as a function of the road speed of the vehicle.

Another object of the invention is to provide an improved velocity or mixture flow type governor incorporating improved means which enables the vehicle engine to attain a higher speed when the vehicle transmission is operating in the lower gear or high torque multiplying ranges while limiting the engine speed and road speed of the vehicle in the higher gear or direct drive ranges to a predetermined value.

Another object of the invention is to provide improved apparatus for governing an internal combustion engine incorporating improved means for controlling the governing action thereof.

Still another object of the invention is to provide an improved engine governing apparatus that is economical to manufacture and assemble, durable, efficient and reliable in operation.

The above as well as other objects and advantages of the present invention will become apparent from the following description, the appended claims and the accompanying drawings wherein:

FIGURE 1 is a side elevational view of apparatus embodying the present invention, showing the same installed on an internal combustion engine of an automotive vehicle;

FIG. 2 is a longitudinal sectional view of the road speed sensing mechanism illustrated in FIG. 1;

FIG. 3 is a transverse sectional view of a portion of the structure illustrated in FIG. 2, taken on the line 3—3 thereof;

FIG. 4 is a top plan view, with portions in section, of the engine governing mechanism illustrated in FIG. 1;

FIG. 5 is a side elevational view of a portion of the structure illustrated in FIG. 4;

FIG. 6 is an end view of the structure illustrated in FIG. 4;

FIG. 7 is a sectional view of a portion of the structure illustrated in FIG. 6, taken on the line 7—7 thereof;

FIG. 8 is a sectional view of a portion of the structure illustrated in FIG. 6, taken on the line 8—8 thereof;

FIG. 9 is a sectional view of a portion of the structure illustrated in FIG. 4, taken on the line 9—9 thereof;

FIG. 10 is a group of curves showing the variation in torque in inch pounds on a governor throttle plate versus the deflection of the throttle plate in degrees for different spring arrangements; and FIG. 11 is a family of curves depicting horsepower output versus engine r.p.m. for different spring arrangements.

Referring to the drawings, the present invention is shown embodied in apparatus, generally designated 10, which is particularly adapted for use in governing an internal combustion engine on an automotive vehicle, although it will be understood that the present invention is applicable to other uses. Referring to FIGURE 1, an engine 12 is shown which is coupled to a transmission 14. The transmission 14 may be a sliding gear transmission, an automatic transmission, or any other desired or conventional type of transmission, and it may include any desired number of gear reduction or torque multiplying ranges, direct drive or high gear range, and in some cases an over-drive range, the output shaft 16 of the transmission being connected in driving relationship to the wheels of the vehicle. A conventional speedometer drive cable 18 is also illustrated in FIGURE 1, one end portion of the cable being geared to the output shaft 16 of the transmission 14 so that the cable 18 rotates at a speed proportional to the road speed of the vehicle. The opposite end portion of the cable 18 is connected to a speed sensing mechanism, generally designated 20, which may, for example, be mounted behind the vehicle dashboard 22 and which will be described hereinafter in greater detail. If desired, the drive shaft of a conventional speedometer (not shown) may be connected to the speed sensing mechanism 20 through the agency of a coupling 24.

The engine 12 is shown as being provided with a carburetor and an intake manifold, generally designated 26 and 28, respectively, the carburetor and the intake manifold being a part of the fuel induction system of the internal combustion engine, and the governor is adapted to be mounted in the fuel induction system intermediate the carburetor and the intake manifold so that the fuel/air mixture emanating from the carburetor passes through the governor and passes from the governor into the intake manifold which serves to distribute the fuel/air mixture to the engine cylinders. The governor is comprised of a body 30 that defines a passageway 32 which is open at each end and which, in the embodiment illustrated, is substantially circular in cross-section, although it will be understood that the cross-sectional configuration of the passageway may be other than circular. A throttle plate 34 is provided which is fixed to a shaft 36, as by screws 37, the shaft 36 extending transversely of the passageway 32 defined by the body 30 and being offset in parallel relationship with respect to the transverse diameter of the passageway. The throttle plate 34 is also offset with respect to the longitudinal axis of the shaft 36 so that the portion of the throttle plate with the greatest area extends away from the intake manifold and upstream with respect to the direction of flow of the fuel mixture while the portion of the throttle plate with the least area extends downstream with respect to the direction of flow of the fuel mixture. With such a construction, the forces exerted on the throttle plate 34 by the passage of the fuel mixture through the passageway 32 tend to move the throttle plate toward the closed position.

One end portion of the shaft 36 is journaled for oscillation in a bearing boss 38 provided on one side of the body 30 while the opposite end portion of the shaft extends through a suitable bearing boss 40 provided on the body 30.

The forces exerted on the throttle plate 34 by the passage of the fuel mixture through the passageway 32 tend to vary nonlinearly in value as the throttle plate changes positions, and in order to balance the closing forces exerted on the throttle plate, at governed speeds, in all positions, a reactance mechanism, generally designated 42 is provided. The reactance mechanism 42 includes a cam 44 which is disposed in a compartment 45 defined by the body 30. The cam 44 is fixed to the shaft 36 at a position adjacent the bearing boss 40, the configuration of the surface 46 of the cam 44 being determined by the characteristics of the particular engine with which the governor is associated. One end of a flexible tape 48 is fixed to the cam 44, and the tape extends over the cam surface 46. The distal end of the tape 48 is fixed to one end of a coil spring 50 while the convolutions of the opposite end portion of the coil spring 50 threadably engage an adjusting screw 52 carried by the body 30. With such a construction, the force exerted by the spring is applied through varying radii to resist the nonlinear closing effort of the throttle plate.

For the purpose of stabilizing the throttle plate and to prevent throttle cheat, a piston 54 is provided which is reciprocally mounted in a bore 56 provided in the body 30, the outer end of the bore 56 being sealed by a plug 58 retained by any suitable or conventional means. One end of a piston rod 60 is fixed to the piston 54 and the piston rod extends through an opening 62 provided in the wall of the body 30 defining the passageway 32. The end portion of the piston rod 60 remote from the piston 54 is provided with a recess 64 adapted to receive a laterally extending portion 66 of an actuating member 68, the portion 66 being fixed to the member 68 by a rivet 70, and the end portion of the member 68 remote from the portion 66 being fixed to the throttle plate. With such a construction, longitudinal movement of the piston toward the left, as viewed in FIGURE 4, effects rotation of the throttle plate in a direction to move the throttle plate toward the closed position. Movement of the throttle plate toward the open position effects movement of the piston toward the right, as viewed in FIGURE 4. The head end of the portion of the bore 56 communicates with the atmosphere, such communication being effected through openings 72 in the wall of the body defining the bore 56, while the rod end portion of the bore communicates with the passageway 32 through the opening 62. With such a construction, an increase in the vacuum in the passageway 32 effects an increase in the vacuum at the rod end of the bore 56 with the result that the piston tends to move to the left, as viewed in FIGURE 4. As the piston moves to the left, the distal end of the rod engages the portion 66 of the actuating member 68 so as to move the member toward the left, as viewed in FIGURE 4, thereby effecting rotation of the throttle plate and shaft 36 and moving the throttle plate toward the closed position. Since the piston moves in response to the reduction in pressure in passageway 32, such a construction substantially prevents throttle cheat. Such a construction also enables the piston to assist the forces exerted on the throttle plate 34 by the flow of the fuel mixture through the passageway 32 to move the throttle plate toward the closed position and also provides a stabilizing effect on the throttle plate because of the dashpot action of the piston, thereby reducing hunting of the governor to a minimum.

In accordance with the present invention, means is provided for inhibiting the movement of the throttle plate toward the closed position until the road speed of the vehicle reaches a predetermined value, such means enabling the vehicle engine to attain a higher speed when the vehicle transmission is operating in the lower gear or high torque multiplying ranges but permitting the throttle plate to limit the engine speed to governed speed in the higher gear ranges as soon as the road speed reaches a predetermined value.

In accordance with the present invention, an arm 74 is provided, one end portion of which is mounted on the end portion of the shaft 36 which projects through the bearing boss 40. The arm 74 is also fixed to the side wall of the cam 44. The end portion of the arm remote from the shaft 36 carries a pin 78 which normally abuts a fixed abutment stop 79 when the throttle plate 34 is in the wide open position. Means is provided for holding the pin against the abutment stop and to inhibit the movement of the throttle plate toward the closed position until the road speed of the vehicle reaches a predetermined value and thereafter moving the holding means out of obstructing relationship with respect to the pin 78 so that the throttle plate is free to move toward the closed position and govern the engine. Such means includes a piston 80 which is mounted in a cylinder 82 defined by a housing 84 carried by the body 30. A piston rod 86 is provided, one end portion of which is fixed to the piston 80 while the opposite end portion of the rod engages the pin 78 when the piston is in the position illustrated in FIGURE 4. A coil spring 88 is provided, one end portion of which engages an adjustment cap 90 which serves to close the end of the cylinder 82 while the opposite end portion of the coil spring 88 projects into a chamber 92 defined by the piston 80 and engages the head 94 of the piston. The spring 88 is assembled with a precompression preload to resiliently resist the throttle plate 34 from moving toward the closed position when the pressure within the cylinder 82 at the opposite end of piston 80 is equalized.

The rod end of the cylinder 82 communicates with the ambient atmosphere through a vent port 96 provided in the housing 84. The housing 84 also defines a pair of ducts 98 and 100, one end of each duct 98 and 100 communicating with the cylinder 82 at the end thereof remote from the vent port 96 and adjacent the adjustment cap 90. The opposite ends of the ducts 98 and 100 communicate with a passageway 102 through ports 98a and 100a respectively. A valve 104 is provided which is mounted for sliding movement in the passageway 102. The valve 104 is provided with a pair of axially spaced annular grooves 106 and 108, the spacing of the grooves 106 and 108 being such that when the groove 106 is aligned with the port 100a, the port 98a is closed by the valve 104, and when the groove 108 is aligned with the port 98a, the port 100a is closed by the valve 104. The land portion 110 intermediate the grooves 106 and 108, and the end portions of the valve have a sliding fit in the passageway 102 so that a substantially fluid tight seal is effected. A vent port 112 is provided, one end of which communicates with the ambient atmosphere while the other end of the vent port communicates with the valve passageway 102 at a position aligned with the port 100a so that when the valve 104 occupies the position illustrated in FIGURES 7 and 8, a fluid path is provided from the cylinder 82 through the duct 100, port 100a, the groove 106 and the vent port 112 to the ambient atmosphere. The housing 84 and body 30 also define coaxially aligned ducts 114 and 116. One end of the duct 114 communicates with the passageway 102 through a port 114a while the opposite end of the duct 114 communicates with the one end of the duct 116. The opposite end of the duct 116 communicates with the passageway 30 at a position below or downstream of the throttle plate. When the valve 104 is shifted to align the groove 108 with the ports 98a and 114a, the vacuum in the passageway 32 may be applied to the cylinder 82 through the duct 98, port 98a, the groove 108, port 114a, and the vacuum ducts 114 and 116, such reduction in pressure in the cylinder 82 being sufficient to overcome the force of the spring 88 and effect movement of the piston 80 to the end of the cylinder adjacent the cap 90 so that the piston rod 86 is moved out of resiliently resisting relationship with respect to the pin 78, thus enabling the throttle plate to move toward the closed position.

A solenoid 118 is provided which is mounted in a recess 120 defined by the housing 84, the solenoid being adapted to be energized to shift the valve 104 when the road speed of the vehicle reaches a predetermined value. The solenoid winding is electrically connected to the speed sensing mechanism 20, as will be described hereinafter in greater detail.

One end of the valve 104 is fixed to the movable core 122 of the solenoid 118 while the opposite end of the valve 104 bears against a coil spring 124 disposed in the valve passageway 102. The opposite end of the spring 124 abuts a plug 126 fixed in the end of the valve passageway remote from the solenoid. With such a construction, when the solenoid is de-energized, the valve 104 is held in the position illustrated in FIGURES 7 and 8 by the spring 124 so that both end portions of the cylinder 82 communicate with the atmosphere through the vent 96 and the duct 100 as above described. When the solenoid 118 is energized, the movable core of the solenoid shifts the valve 104 to the right, as viewed in FIGURE 7, so that the ports 112 and 100a are closed and the end portion of the cylinder 82 adjacent the cap 90 communicates with the passageway 32 on the downstream side of the throttle plate 34 through the duct 98, port 98a, groove 108, port 114a, and vacuum ducts 114 and 116 so that the vacuum normally present in the passageway 32 when the engine is operating effects a reduction of the pressure in the end portion of the cylinder 82 adjacent the cap 90 with the result that the piston 80 moves to the left, as viewed in FIGURE 4.

An inspection of FIGURE 10 shows three curves representing the torque on the governor throttle plate in inch pounds versus the plate rotation in degrees. These curves were obtained from tests utilizing a governor as depicted by the FIGURES 1–9.

Curve A in FIGURE 10 represents the variations in torque and deflection when spring 50 (FIGURE 4) is used alone with a predetermined preload. As previously mentioned, in order to obtain full engine performance in the lower gear ranges, it is necessary to increase the preload acting on the governor throttle plate in order to hold the throttle plate open longer. This has been done in the past by simply increasing the pretension on the spring 50. The result of this increase in pretension can be seen in curve B of FIGURE 10. This method of holding the throttle plate open longer produces some undesirable regulation characteristics which are discussed hereinafter in greater detail.

In the embodiment of the invention shown in FIGURE 4, the increased preload is obtained not by the pretensioning of the spring 50 but by precompression of spring 88. Thus in low gear, in order to effect angular movement of the throttle plate, the force of spring 88 as well as that of spring 50 must be overcome. In the preferred embodiment of this invention the spring 88 has a relatively low rate, in the range of .09 pound per inch, in comparison to the rate of spring 50. Thus for all practical purposes the spring 88 is effective only in creating a preload, any increase in force caused by further compression being negligible. Curve C in FIGURE 10 represents the effects on throttle plate rotation due to the combined loads of spring 50 and spring 88.

A comparison of curve B with curve C of FIGURE 10 shows that at 4.0 inch pounds of torque the throttle valve plate is held open approximately 3½ to 4 degrees more by preloading spring 50 (curve B) than by the addition of spring 88 without preloading spring 50 (curve C). As is known to those skilled in the art, the movement of the governor throttle plate near the closed position is much more sensitive and critical than when it is near the open position. It is also known to those skilled in the art that as the engine speed which the governor is to control increases, the greater is the effect on the engine speed with the slightest throttle plate movement. For example, it has been observed from tests conducted utilizing a commercial engine that at approximately 3.2 inch pounds of torque, resulting in approximately 1.25 degrees difference in plate opening between curve B and curve C, a 200 r.p.m. difference in speed results in an engine to be controlled at approximately 2800 r.p.m. In that case the engine will reach a speed of 3000 r.p.m. if controlled by means of preloading the spring 50 as shown in curve B, FIGURE 10. It is approximated that at an engine speed of 4000 r.p.m. the torque on the governor throttle plate would be 4.0 inch pounds. From the curves B and C of FIGURE 10, it can be seen that at 4.0 inch pounds the throttle plate would be held open approximately 3.75 degrees more by the preloading of spring 50 than by the preloading of spring 88. At a desired governed speed of 4000 r.p.m. this 3.75 degrees greater plate opening would result in approximately 1000 r.p.m. higher engine speed. A graphic example of this result can be seen in FIGURE 11.

FIGURE 11 represents a family of curves relating to the horsepower output of an engine versus engine r.p.m. Curve A of FIGURE 11 indicates the operation of a governor as depicted in the drawings under high gear operation without the effects of the preloading of spring 88. Curves B, C, D and E of FIGURE 11 indicate the result in lower gear ranges with preloading of spring 88. Curves F, G, H and I indicate the curves corresponding to curves B, C, D and E if preloading of spring 50 were used in lieu of the preloading of spring 88.

From a comparison of the curves of FIGURE 11 it can be seen that in each instance the regulation is worse when preloading of spring 50 is used instead of the preloading of spring 88. At governed speeds of approximately 4000 r.p.m. the no load speed could be excessive, resulting in damage to the engine. Thus the results in governor regulation obtainable by the use of spring 88 in lieu of pretensioning of spring 50 can be readily appreciated.

The speed sensing mechanism 20 is shown as being adapted to be interposed between the vehicle speedometer and the speedometer cable 18 so that both the speedometer and the speed sensing mechanism 20 are driven by the speedometer cable. The speed sensing mechanism includes a housing 130 which carries a shaft 132 mounted for rotation in a bearing 133 fixed to the housing, one end of the shaft being connected to the speedometer cable 18 while the opposite end of the shaft 132 may be connected to the speedometer by the coupling 24. A pair of centrifugal weights 136 and 138 are provided which are pivotally connected to the shaft 132 by link arms 140 and 142 and to a sleeve 144 by a second pair of link arms 146 and 148. The sleeve 144 is provided with shoulder portions 150 and 152 which bear against a bifurcated crank member 154 pivotally connected to the housing 130, as at 156 and 157. The crank member 154 includes an arm portion 158 which acts against a coil spring 160, one end of which is connected to the arm 158 of the crank member while the opposite end of the spring 160 is connected to an adjustable anchor 162 mounted in a passageway 164 defined by the housing 130 and secured by an adjustment screw 166 which threadably engages the anchor 162.

As the speed of the vehicle increases, the weights 136 and 138 move outwardly, thereby moving the sleeve 144 to the left, as viewed in FIGURE 2, and causing the crank 154 to pivot in a clockwise direction. An over-center action electrical switch, generally designated 168, is provided which is actuated by the crank 154. The switch 168 includes a fixed contact 170 which is carried by a supporting bracket 172 fixed to the top wall 174 of the housing 130, suitable insulation 176 being provided to electrically insulate the contact 170 and its associated terminal 178 from the remaining contacts and terminals. If desired, a second fixed contact 180 may be provided for a purpose which will be described hereinafter in greater detail, the contact 180 being electrically connected to a terminal 182. A movable contact 184 is provided which is carried by a switch arm 186. A resilient generally U-shaped support member 188 is provided, one end portion of which is fixed to the housing, as at 190, and provided with a terminal 192. The opposite end of the resilient support member 188 is pivotally connected to the switch arm 186, as at 194. A coil spring 196 is also provided, one end portion of which is fixed to the housing 130 by a clip 198 while the opposite end portion of the spring is connected to the switch arm 186 at a position intermediate the ends thereof. The resilient support member 188 bears against one end of an arm 200 provided on the crank member 154. With such a construction, as the crank member 154 moves angularly in a clockwise direction, the free end portion of the arm 200 of the crank 154 bears against the resilient support member 188 so as to cause the support member to bend upwardly as viewed in FIGURE 2. As the support member moves, the pivotal connection 194 between the switch arm 186 and the support member 188 moves past the line of action of the spring 196. When the pivotal axis moves past the line of action of the spring 196, the contacts 184 and 170 close with a snap action so as to complete an electrical circuit from the support member terminal 192 through the support member 188, the switch arm 186, and the contacts 184 and 170 to the terminal 178.

If desired, the terminal 182 may be connected in series with the kick down switch of an automatic transmission so as to disable the kick down operation of the automatic transmission when the contacts 180 and 184 open as the switch arm 186 snaps over center. The initial position of the resilient support member 188 relative to the arm 200 may be adjusted through the agency of a screw 202 carried by a bracket 204 fixed to the top wall of the housing 130. The speed at which the weights 136 and 138 move the crank 154 to effect a closing of the contacts 184 and 170 may be adjusted by varying the tension on the spring 160 through the agency of the screw 166.

The terminal 192 is connected to the vehicle battery 206 by a conductor 208. If desired, the circuit through the conductor 208 may be controlled by a switch 210 which may, for example, be a part of the ignition switch of the vehicle. As previously mentioned, the terminal 182 may be connected in series with the kick down switch of an automatic transmission so that a circuit is provided from the battery to the kick down switch when the contacts 180 and 184 are closed, such circuit being interrupted when the contacts 180 and 184 open. The terminal 178 is connected by a conductor 212 to one end of the solenoid winding, the other end of the winding being connected to ground by a conductor 214.

In the operation of the apparatus, assuming that it is desired to limit the engine speed to 2200 r.p.m. and provide a maximum road speed of 40 m.p.h in the high gear on direct drive range, while permitting higher engine speeds when the transmission is operating in the lower or intermediate gear ranges with the road speed less than 40 m.p.h., the speed sensing mechanism 20 is adjusted in the manner previously described so that the contacts 180 and 184 open and the contacts 184 and 170 close when the shaft 132 rotates at a speed corresponding to a road speed of 40 m.p.h.

Assuming that the vehicle is operating at a speed less than 40 m.p.h., the piston rod 86 abuts the pin 78 and prevents the throttle plate 34 from moving toward the closed position with the result that the engine is permitted to attain a speed above the governed speed of 2200 r.p.m. because of the inhibited condition of the throttle plate.

When the vehicle reaches a road speed of 40 m.p.h., the contacts 184 and 170 close with the result that a circuit is completed from the battery 206 through the conductor 208, the switch 210, the terminal 192, support member 188, switch arm 186, the contacts 184 and 170, the terminal 178, the conductor 212 and the winding of the solenoid to ground so as to energize the solenoid. The movable core of the solenoid then shifts the valve 104 to the right, as viewed in FIGURE 7, so that the vacuum in the passageway 32 is communicated to the cylinder 82 through the ducts 116 and 114, the port 114a, the groove 108, the port 98a and the duct 98 to the cylinder 82 so as to effect the movement of the piston 80 toward the left, as viewed in FIGURE 4. As the piston 80 moves toward the adjustment cap 90, the piston rod 86 is moved out of resiliently resisting relationship with respect to the pin 78 with the result that the throttle plate 34 moves toward the closed position and the governing function is affected by spring 50 alone.

While a preferred embodiment of the invention has been shown and described, it will be understood that various changes and modifications may be made without departing from the spirit of the invention.

What is claimed is:

1. Apparatus for governing the speed of an internal combustion engine on an automotive vehicle comprising, in combination, a body defining a fuel mixture passageway, an unbalanced throttle plate mounted in said passageway, said throttle plate being adapted to be moved toward the closed position by the flow of fuel through said passageway, first resilient means effective to resist the movement of said throttle plate toward the closed position, second resilient means to supplement said first resilient means and effective to resist the movement of said throttle plate toward the closed position and means including said second resilient means and being responsive to the road speed of the vehicle for resisting the movement of said throttle plate toward the closed position through all road speeds of the vehicle up to a predetermined maximum value.

2. Apparatus for governing the speed of an internal combustion engine on an automotive vehicle comprising, in combination, a body defining a fuel mixture passageway, an unbalanced throttle plate mounted in said passageway, said throttle plate being adapted to be moved toward the closed position by the flow of fuel through said passageway, first resilient means effective to resist the movement of said throttle plate toward the closed position, second resilient means to supplement said first resilient means and operable to resist the movement of said throttle plate toward the closed position, and means responsive to the road speed of the vehicle for disabling said second resilient means upon attainment of a predetermined road speed by the vehicle.

3. Apparatus for governing the speed of an internal combustion engine on an automotive vehicle comprising, in combination, a body defining a fuel mixture passageway, an unbalanced throttle plate pivotally mounted in said passageway, said throttle plate being adapted to be moved toward the closed position by the flow of fuel through said passageway, first resilient means effective to resist movement of said throttle plate toward the closed position, and second resilient means to supplement said first resilient means and effective to resist the movement of said throttle plate toward the closed position, said second resilient means including piston and cylinder means being actuable for terminating the resistance of said second resilient means to the movement of said throttle plate toward the closed position, and means for actuating said piston and cylinder means responsively to the road speed of the vehicle.

4. Apparatus for governing the speed of an internal combustion engine on an automotive vericle comprising, in combination, a body defining a fuel mixture passageway, an unbalanced throttle plate pivotally mounted in said passageway and supported by said body, said throttle plate being adapted to be moved toward the closed position by the flow of fuel through said passageway, first resilient means urging said throttle plate toward the open position, resilient means to supplement said first resilient means and effective to resist the movement of said throttle plate toward the closed position with said second resilient means having a preload of a preselected magnitude and means including said second resilient means and being responsive to the road speed of the vehicle for resisting the movement of said throttle plate toward the closed position through all road speeds of the vehicle up to a predetermined maximum value.

5. Apparatus for governing the speed of an internal combustion engine on an automotive vehicle comprising, in combination, a body defining a fuel mixture passageway, an unbalanced throttle plate pivotally mounted in said passageway and supported by said body, said throttle plate being adapted to be moved toward the closed position by the flow of fuel mixture through said passageway, first resilient means operatively connected to said throttle plate and urging said throttle plate toward the open position, second resilient means to supplement said first resilient means and effective to resist the movement of said throttle plate toward the closed position, said second resilient means including piston and cylinder means being actuable for terminating the resistance of said second resilient means to the movement of said throttle plate toward the closed position, and means including valve means for actuating said piston and cylinder means responsively to the road speed of the vehicle.

6. Apparatus for governing the speed of an internal combustion engine on an automotive vehicle comprising, in combination, a body defining a fuel mixture passageway, an unbalanced throttle plate pivotally mounted in said passageway and supported by said body, said throttle plate being adapted to be moved toward the closed position by the flow of fuel mixture through said passageway, first resilient means operatively connected to said throttle plate and urging said throttle plate toward the open position, housing means carried by said body and defining a cylinder, piston means mounted for reciprocation in said cylinder, second resilient means operatively associated with said piston means and operable to resist the movement of said throttle plate toward the closed position, valve means for controlling the movement of said piston means, and means including electrical switch means responsive to the road speed of the vehicle for controlling said valve means.

7. Apparatus for governing the speed of an internal combustion engine on an automotive vehicle comprising, in combination, a body defining a fuel mixture passageway, an unbalanced throttle plate pivotally mounted in said passageway, said throttle plate being adapted to be moved toward the closed position by the flow of fuel mixture through said passageway, first resilient means operatively connected to said throttle plate and urging said throttle plate toward the open position, second resilient means to supplement said first resilient means and effective to resist the movement of said throttle plate toward the closed position, said second resilient means including piston and cylinder means being actuable for terminating the resistance of said second resilient means to the movement of said throttle plate toward the closed position, and means including centrifugal switch means for actuating said piston and cylinder means responsively to the road speed of the vehicle.

8. Apparatus for governing the speed of an internal combustion engine on an automotive vehicle, comprising, in combination, a body defining a fuel mixture passageway, an unbalanced throttle plate pivotally mounted in said passageway, the larger of the unbalanced areas of said throttle plate normally projecting upstream of said passageway whereby the fuel mixture flowing through said passageway urges said throttle plate toward the closed position, first resilient means operatively connected to said throttle plate and urging said throttle plate toward the open position, a housing carried by said body and defining a cylinder, piston means mounted for reciprocation in said cylinder, second resilient means operatively associated with said piston means and effective to resist movement of said throttle plate toward the closed position, duct means connecting one end portion of the cylinder defined by said housing with said passageway, valve means for controlling the flow of fluid through said duct means, and means responsive to the road speed of the vehicle for controlling said valve means.

9. Apparatus for governing the speed of an internal combustion engine on an automotive vehicle, comprising, in combination, a body defining a fuel mixture passageway, an unbalanced throttle plate pivotally mounted in said passageway, the larger of the unbalanced areas of said throttle plate normally projecting upstream of said passageway whereby the fuel mixture flowing through said passageway urges said throttle plate toward the closed position, first resilient means operatively connected to said throttle plate and urging said throttle plate toward the open position, a housing carried by said body and defining a cylinder, piston means mounted for reciprocation in said cylinder, second resilient means operatively associated with said piston means and effective to resist movement of said throttle plate toward the closed position, duct means connecting one end portion of the cylinder defined by said housing with said passageway, valve means for controlling the flow of fluid through said duct means, and means including electrical switch means responsive to the road speed of the vehicle for controlling said valve means.

10. Apparatus for governing the speed of an internal combustion engine on an automotive vehicle comprising, in combination, a body defining a fuel mixture passageway, an unbalanced throttle plate mounted in said passagewey, said throttle plate being adapted to be moved toward the closed position by the flow of fuel through said passageway, first resilient means effective to resist the moving effort of said throttle plate toward the closed position, second resilient means to supplement said first resilient means and effective to resist the moving effort of said throttle plate toward the closed position, means operative with one of said first and said second resilient means and operative with said throttle plate for varying the resultant force from the moving effort from said throttle plate to said one of said first resilient means and said second resilient means in accordance with variations in the position of said throttle plate, and means operative with the other of said first resilient means and said second resilient means and operative with said throttle plate for applying the resultant force from the moving effort from said throttle plate to said other of said first resilient means and said second resilient means substantially constantly regardless of the position of said throttle plate.

11. Apparatus for governing the speed of an internal combustion engine on an automotive vehicle comprising, in combination, a body defining a fuel mixture passageway, an unbalanced throttle plate mounted in said passageway, said throttle plate being adapted to be moved toward the closed position by the flow of fuel through said passageway, first resilient means effective to resist the moving effort of said throttle plate toward the closed position, second resilient means to supplement said first resilient means and effective to resist the moving effort of said throttle plate toward the closed position, means operative with said first resilient means and operative with said throttle plate for varying the resultant force from the moving effort from said throttle plate to said first resilient means in accordance with variations in the position of said throttle plate, and means operative with said second resilient means and operative with said throttle plate for applying the resultant force from the moving effort from said throttle plate to said second resilient means substantially constantly regardless of the position of said throttle plate.

12. The apparatus of claim 11 with said first resilient means including a first spring member having a high spring rate and being adapted to resist the moving effort of said throttle plate toward the closed position, and said second resilient means includes a second spring member having a low spring rate relative to that of said first spring member and being assembled under a high preload and adapted to resist the moving effort of said throttle plate toward the closed position.

13. Apparatus for governing the speed of an internal combustion engine on an automotive vehicle comprising, in combination, a body defining a fuel mixture passageway, an unbalanced throttle plate pivotally mounted in said passageway, said throttle plate being adapted to be moved toward the closed position by the flow of fuel through said passageway, first resilient means effective to resist movement of said throttle plate toward the closed position, and second resilient means to supplement said first resilient means and effective to resist the movement of said throttle plate toward the closed position, said first resilient means including a first spring member having a high spring rate and being adapted to resist the movement of said throttle plate toward the closed position, said second resilient means including a second spring member having a low spring rate relative to the spring rate of said first spring member and being assembled under a high preload and being adapted to resist the movement of said throttle plate toward the closed position.

References Cited in the file of this patent

UNITED STATES PATENTS

| | | |
|---|---|---|
| Re. 21,776 | Hoof | Apr. 22, 1941 |
| 1,897,324 | Murrow | Feb. 14, 1933 |
| 2,372,274 | Hoppe | Mar. 27, 1945 |
| 2,408,161 | Darnell | Sept. 24, 1946 |
| 2,493,883 | Larsen | Jan. 10, 1950 |
| 2,612,965 | Christie | Oct. 7, 1952 |
| 2,888,031 | Malecki | May 26, 1959 |
| 2,911,054 | Malecki et al. | Nov. 3, 1959 |

UNITED STATES PATENT OFFICE
CERTIFICATE OF CORRECTION

Patent No. 3,065,812                 November 27, 1962

Witold Malecki

It is hereby certified that error appears in the above numbered patent requiring correction and that the said Letters Patent should read as corrected below.

Column 9, line 28, before "resilient", first occurrence, insert -- second --; column 10, line 61, for "passagewey" read -- passageway --.

Signed and sealed this 25th day of June 1963.

(SEAL)
Attest:

ERNEST W. SWIDER
Attesting Officer

DAVID L. LADD
Commissioner of Patents